United States Patent [19]

Mattia

[11] 4,452,612

[45] Jun. 5, 1984

[54] SEPARATION AND PURIFICATION OF GASES AND VAPORS BY CONTINUOUS PRESSURE-SWING ADSORPTION

[75] Inventor: Manlio M. Mattia, West Chester, Pa.

[73] Assignee: Cubemco, Inc., West Chester, Pa.

[21] Appl. No.: 421,642

[22] Filed: Sep. 22, 1982

[51] Int. Cl.³ .............................................. B01D 53/06
[52] U.S. Cl. .......................................... 55/25; 55/60; 55/78; 55/181; 55/390
[58] Field of Search .............................. 55/31, 33–35, 55/58, 60–62, 77, 78, 179–181, 189, 208, 390, 25, 26

[56] References Cited

U.S. PATENT DOCUMENTS

| | | | |
|---|---|---|---|
| 1,602,500 | 10/1926 | Nuss | 55/181 X |
| 1,912,784 | 6/1933 | Miller et al. | 55/390 X |
| 1,948,779 | 2/1934 | Abbott et al. | 55/33 |
| 2,294,214 | 8/1942 | Seinfeld | 55/390 X |
| 2,347,829 | 5/1944 | Karlsson et al. | 55/390 X |
| 2,617,986 | 11/1952 | Miller | 55/390 X |
| 2,662,607 | 12/1953 | Moragne | 55/179 |
| 2,880,818 | 4/1959 | Dow | 55/179 |
| 2,993,563 | 7/1961 | Munters et al. | 55/34 |
| 3,109,722 | 11/1963 | Dow | 55/21 |
| 3,164,452 | 1/1965 | Westeren et al. | 55/33 |
| 3,176,446 | 4/1965 | Siggelin | 55/189 |
| 3,246,961 | 4/1966 | Karlsson | 55/78 X |
| 3,252,273 | 5/1966 | Stephens | 55/179 |
| 3,292,346 | 12/1966 | Adams | 55/33 X |
| 3,306,006 | 2/1967 | Urban | 55/33 X |
| 3,401,504 | 9/1968 | Moragne | 55/179 |
| 3,455,089 | 7/1969 | Mattia | 55/62 |
| 3,490,201 | 1/1970 | Colvin et al. | 55/34 X |
| 3,534,529 | 10/1970 | Mattia | 55/62 |
| 3,594,984 | 7/1971 | Toyama et al. | 55/33 |
| 3,713,272 | 1/1973 | Barrere, Jr. et al. | 55/33 |
| 3,788,037 | 1/1974 | Shell et al. | 55/58 |
| 3,796,022 | 3/1974 | Simonet et al. | 55/33 X |
| 3,800,859 | 4/1974 | Norback | 55/390 X |
| 3,847,578 | 11/1974 | Munters | 55/390 |
| 4,231,764 | 11/1980 | Mattia | 55/62 |
| 4,365,979 | 12/1982 | Takeyama et al. | 55/181 |

FOREIGN PATENT DOCUMENTS 719887 4/1942 Fed. Rep. of Germany .......... 55/77
52-51155 4/1977 Japan ..................................... 55/181

OTHER PUBLICATIONS

"Simple Gas Adsorber Features Self-Regeneration", Chemical Engineering, Nov. 30, 1981, p. 71.
C. W. Wolf, "PSA System Can Reduce Hydrogen Costs", Oil & Gas Journal, Feb. 23, 1976.
J. L. Wagner & H. A. Stewart, "Pressure Swing Adsorption-Characteristics and Applications", paper presented at meeting of IIQPR & AIChE, May 17–20, 1970.
G. M. Lukchis, "Adsorption Systems, Part I: Design by Mass-Transfer-Zone Concept", Chemical Engineering, Jun. 11, 1973.
G. M. Lukchis, "Adsorption Systems, Part II: Equipment Design", Chemical Engineering, Jul. 9, 1973.
G. M. Lukchis, "Adsorption Systems, Part III: Adsorbent Regeneration", Chemical Engineering, Aug. 6, 1973.
"The OXYSIV PSA System", a Union Carbide Corp. Sales Brochure, undated.
Description of Union Carbide Corp. PSA System, untitled and undated.
PURASIV HR System Brochure, Explanation Sheet and Flow Diagram, undated, by Union Carbide Corp.

Primary Examiner—Robert H. Spitzer
Attorney, Agent, or Firm—Panitch, Schwarze, Jacobs & Nadel

[57] ABSTRACT

An apparatus for separating or purifying gaseous material having more or less adsorbable components includes a high pressure inlet chamber, a high pressure outlet chamber and a low pressure chamber. Adsorbent means retain an adsorbent capable of selectively adsorbing the more adsorbable component at a predetermined pressure level. There are also means for establishing a high pressure flow path for the gaseous material from the high pressure inlet chamber through the adsorbent means to the high pressure outlet chamber. The more adsorbable component is adsorbable by the adsorbent in the high pressure flow path. Further means establish a low pressure desorption flow path from the adsorbent means to the low pressure chamber. The two means for establishing flow paths are operable simultaneously to continuously separate or purify the gaseous material. A process for separating or purifying gaseous material is also disclosed. The gaseous material is pressurized to a pressure at which the more adsorbable component will be adsorbed by an adsorbent preferentially compared the less adsorbable component. The pressurized gaseous material is caused to flow through and contact the adsorbent to adsorb the more adsorbable component, thereby separating the more adsorbable component from the less adsorbable component.

18 Claims, 10 Drawing Figures

SEPARATION AND PURIFICATION OF GASES AND VAPORS BY CONTINUOUS PRESSURE-SWING ADSORPTION

CROSS REFERENCE TO RELATED APPLICATION

This application is related to my copending patent application Ser. No. 328,033, filed Dec. 7, 1981, now U.S. Pat. No. 4,409,006.

FIELD OF THE INVENTION

The present invention relates to the separation and purification of gaseous materials. More particularly, this invention concerns economically recovering valuable gaseous materials from mixtures of various gaseous materials or the removal of contaminants from gaseous materials by employing the pressure-swing adsorption principle in a continuous process. The present invention can be used at any pressure, over a wide temperature range and can be applied to both the gas processing and pollution control industries.

BACKGROUND OF THE INVENTION

Technologies employed today for the separation of gases include the following: cryogenic fractionation, absorption in a selective solvent, membrane permeation and adsorption on a solid material, such as activated carbon, a molecular sieve or silica gel.

Cryogenic separations require a combination of low temperature and high pressure to liquify the gases so that subsequently they may be separated by distillation. The ability to obtain high purity products is a function of the relative volatility of the components at cryogenic temperatures. Cryogenic processes are generally energy intensive and require high capital investment.

Absorption processes employ a solvent which either physically absorbs or chemically combines with one or more of the gases to be separated. A stripper is required to remove the absorbed material from the solvent. The stripper is usually a fractionation tower and heat is applied to strip the absorbed gases. The lean solvent must then be cooled and recycled back to the absorber which likewise is usually a fractionation tower.

The "SELEXOL" process owned by Norton Company and the "RECTISOL" process developed by Lurgi Gesellschaft für Wärmetechnik are examples of physical absorption processes which use different solvents to remove carbon dioxide and hydrogen sulfide from gas streams. The "COSORB" process developed by Tenneco Chemicals, Inc. is an example of a chemical absorption process. A special solvent can chemically complex and reversibly decomplex carbon monoxide so that the carbon monoxide is preferentially removed from gas streams. Other chemical solvents are monoethanolamine and diethanolamine which are used to recover hydrogen sulfide and carbon dioxide from gas streams. Chemical absorption is very specific and cannot be applied universally for all gas separation processes.

Membrane permeation is based on the fact that when a pressure differential exists across a special membrane, one gas will pass through the membrane more rapidly than others. Monsanto's "PRISM" permeators are presently used to recover hydrogen from ammonia plant purge gas.

Adsorption is a single unit operation which can separate gases with minimum expenditure of energy and capital. The more conventional adsorption processes employ a multi-bed cyclic operation and are thermally regenerated. Examples of this concept are described in my U.S. Pat. No. 3,455,089, issued July 15, 1970, entitled "Process For Removing Organic Contaminants From Air", and in my U.S. Pat. No. 3,534,529, issued Oct. 20, 1970, entitled "Process For Recovering Organic Vapors From Air Streams".

Cyclic, Thermal Swing Adsorbers (TSA) are inherently inefficient and many continuous processes have been proposed to improve their efficiencies. One such process is described in my U.S. Pat. No. 4,231,764, issued Nov. 4, 1980, entitled "System For Removing Organic Contaminants From Air". This process employs a multi-stage fluid bed adsorption system which offers many advantages over multi-bed cyclic systems. However, this process also presents disadvantages such as the high energy cost to maintain fluidization, attrition of the adsorbent, inability to vary gas flow and the limiting gas velocity required to prevent adsorbent entrainment.

Pressure-Swing Adsorption (PSA) is an alternate method for regenerating an adsorbent. As compared to temperature differentials used with TSA, a lower pressure or a vacuum is used to desorb the adsorbent bed. The PSA cycle can be operated close to isothermal conditions without the heating and cooling steps associated with TSA. With PSA, short cycles are possible, thus permitting smaller adsorbers and less adsorbent inventory. For these reasons, the pressure swing cycle is attractive for bulk separation operations as applied in the gas processing industries. One advantage of PSA is the ability to use gas compression as the main source of energy.

The principal disadvantage of PSA is the high gas loss resulting from the pressure release during desorption. This loss can be minimized by employing four or more beds so that depressurization of one bed can be used to purge and repressurize the other beds. This concept has been incorporated in Union Carbide Corporation's "HYSIV" PSA system for hydrogen recovery and purification. The number of beds employed is based on economic considerations; the increase in recovered product must justify the additional capital investment associated with the increased number of beds.

Union Carbide Corporation has developed a single-bed adsorption process using the PSA concept. The system, called Pressure-Swing Parametric Pumping, operates in a single adsorbent bed using the PSA concept with very short and rapid cycles of pressurization and depressurization. Pressure gradients in the bed are developed by the pressure pulses which provide internal purge gas for regeneration, as well as a product flow which is almost continuous. The process is described in *Chemical Engineering*, Nov. 30, 1981, page 71.

There presently exists a need for continuous adsorption systems which can provide high efficiency and flexibility at minimal costs.

DEFINITIONS

"Gas" as referred to herein is a substance which exists in the gaseous state at normal ambient conditions of temperature and pressure. Non-limiting examples of gases include oxygen, nitrogen, hydrogen, carbon dioxide and mixtures of gases such as air.

"Vapor" as referred to herein is the gaseous component in equilibrium with a substance which is a liquid at normal ambient conditions of temperature and pressure. Non-limiting examples of vapors include benzene vapor, toluene vapor, water vapor and mixtures of vapors.

"Gaseous material" as referred to herein means mixtures of gases, mixtures of vapors, or mixtures of gases and vapors.

SUMMARY OF THE INVENTION

One aspect of the present invention is apparatus for separating or purifying gaseous materials having more and less adsorbable components comprising a high pressure inlet chamber, a high pressure outlet chamber and a low pressure chamber, adsorbent means for retaining an adsorbent capable of selectively adsorbing the more adsorbable component of the gaseous material at a predetermined pressure level, means for establishing a high pressure flow path for the less adsorbable component of the gaseous material from the high pressure inlet chamber through the adsorbent means to the high pressure outlet chamber, the more adsorbable component being adsorbable by the adsorbent in the high pressure flow path, and means for establishing a low pressure desorption flow path for the more adsorbable component of the gaseous material from the adsorbent means to the low pressure chamber, the means for establishing the flow paths being operable simultaneously to continuously separate or purify the gaseous material.

The apparatus may include a housing and a rotatable adsorbent bed disposed within the housing. The bed is sealed against the housing to prevent leakage of gaseous material around the adsorbent bed. One or more stationary baffles are located on both sides of the bed. The baffles form at least a high pressure inlet chamber and a low pressure chamber on one side of the bed and a high pressure outlet chamber on the other side of the bed. The baffles are sealed against the bed to prevent leakage of gaseous material between the chambers. A plurality of axial channels are provided in the bed. The axial channels contain adsorbent material. The channels substantially prevent the flow of gaseous material in a direction perpendicular to the axis of rotation of the bed.

Another aspect of the present invention is a process for separating or purifying gaseous materials having more and less adsorbable components comprising the steps:

(a) pressurizing the gaseous material to a pressure at which the more adsorbable component will be adsorbed by an adsorbent preferentially compared to the less adsorbable component, (b) causing the pressurized gaseous material to flow through and contact the adsorbent to adsorb the more adsorbable component, thereby separating the more adsorbable component from the less adsorbable component, (c) recovering the unadsorbed less adsorbable component, (d) lowering the pressure of the adsorbed adsorbable component and any adsorbed portion of the less adsorbable component to desorb the adsorbed more adsorbable component and any adsorbed portion of the less adsorbable component, and (e) recovering the desorbed component, steps (b) and (d) being performed simultaneously to provide a continuous process for separating or purifying the gaseous material.

More specifically, this process involves introducing two or more gaseous materials, such as two or more vapors, two or more gases, or a mixture of vapors and gases into a continuously rotating bed of adsorbent material. The bed is rotated through two or more stages. The stages are maintained at different pressures. The gaseous materials are introduced when the bed is at the highest pressure stage. In this highest pressure stage, the more readily adsorbable of the gaseous materials is adsorbed on the adsorbent and a high purity stream of the least adsorbable of the gaseous materials is withdrawn from the bed. As the bed rotates into the lowest pressure stage, a stream rich in the more adsorbable of the gaseous components is withdrawn from the bed.

The process of this invention also concerns withdrawing a stream of gaseous material from the bed at some intermediate pressure between the relatively higher and lower pressures referred to above, where the adsorbent is purged and repressurized.

The invention also concerns withdrawing the low pressure, less adsorbable component, compressing it and then directing this stream to a similar rotating adsorber to further concentrate the more readily adsorbable component and recover more of the least adsorbable component. Alternately, the second adsorption step may use a different adsorbent material which would reverse the adsorption characteristics of the first step to adsorb preferentially the other components of the gaseous material.

BRIEF DESCRIPTION OF THE DRAWINGS

For the purpose of illustrating the invention there are shown in the drawings forms which are presently preferred; it being understood, however, that this invention is not limited to the precise arrangements and instrumentalities shown.

DETAILED DESCRIPTION OF THE INVENTION

Figures 1, 2:
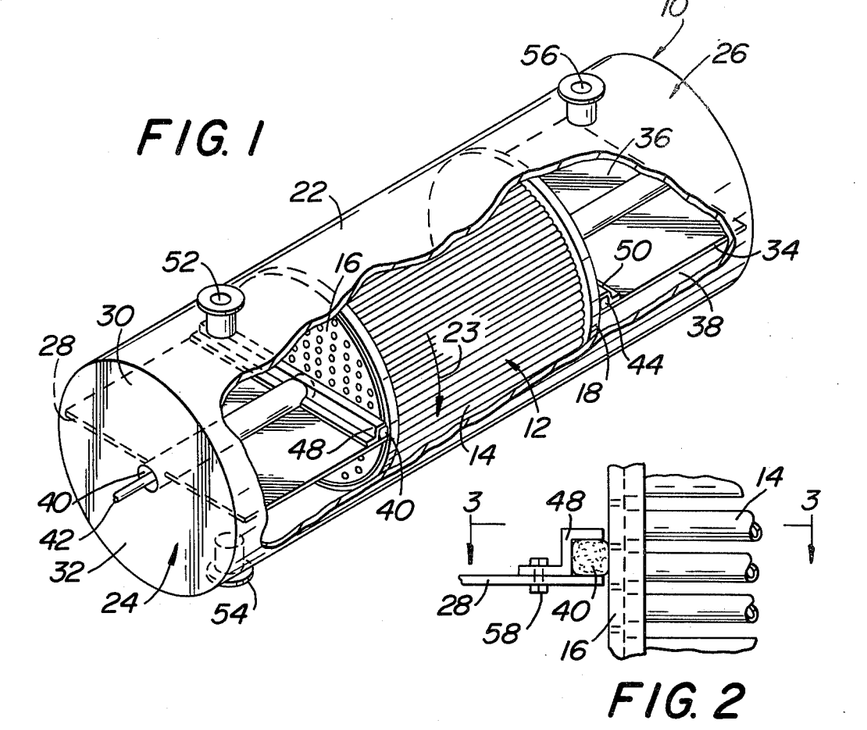
FIG. 1 is a perspective view depicting an apparatus for continuous separation of gaseous materials according to the present invention.
FIG. 2 is a partial sectional view depicting in detail the sealing of the tube sheet of the apparatus shown in FIG. 1.

Referring to the drawings, wherein like numerals indicate like elements, there is shown in FIG. 1 an adsorber apparatus 10 according to the present invention. An adsorber bed 12 disposed within the cylindrical adsorber 10 includes a bundle of tubes 14 connected at each end to apertured tube sheets 16 and 18. Bundle of tubes 14 and tube sheets 16 and 18 are similar to the tube arrangement in a shell and tube heat exchanger. Each tube 14 in the adsorber bed 12 is associated with an aperture in each apertured tube sheet 16 and 18. Each tube 14 is packed with either granular, fibrous, or a porous solid core material composed of activated carbon, molecular seives, silica gel or other suitable adsorbent or catalyst. Retainer screens (not shown in FIG. 1) are placed at the ends of each tube 14 to hold the adsorbent in place. The adsorber bed 12 is housed in the adsorber shell 22 and is free to rotate within the shell 22, for example in the direction of arrow 23.

Within adsorber shell 22, at each end of the adsorber bed 12 are two portions illustrated in FIG. 1, for example, as cylindrical plenums 24 and 26. A longitudinal baffle 28 divides plenum 24 into an upper high pressure inlet chamber 30 and a lower low pressure chamber 32. Correspondingly, a longitudinal baffle 34 divides plenum 26 into an upper high pressure outlet chamber 36 and a lower chamber 38. At the middle of the baffle 28 there is a sleeve 40 through which a shaft 42 extends into the adsorber 10. Shaft 42 is connected to the adsorber bed 12 at the tube sheet 16. The shaft 42 is connected to a driver, such as a motor, (not shown) which rotates the shaft 42 and the adsorber bed 12 at the desired speed. The baffles 28 and 34 are stationary and are sealed tightly against the side and ends of the adsorber shell 22 and against the tube sheets 16 and 18 so that gaseous material does not leak through or around the baffles.

The baffles 28 and 34 serve to divide the bed into two pressure zones with the upper chambers 30 and 36 operating at a higher pressure than the lower chambers 32 and 38. The pressure in chamber 30 generally is slightly greater than the pressure in chamber 36. The pressure in chamber 38 generally is slightly greater than the pressure in chamber 32.

In one embodiment of the invention, chamber 38 has a solid wall separating it from the tube sheet 18. Accordingly, chamber 38 is an idle chamber in that there is no communication between bed 12 and chamber 38. In the embodiment of the invention illustrated in FIG. 1, adsorber 10 could be constructed without chamber 38, if desired. In alternate embodiments, gaseous material may flow into and out of chamber 38 and through tubes 14 to act as a purge.

Further, if desired an orifice or valve could be designed in or through baffle 34 to allow purified gaseous material to flow from chamber 36 into chamber 38, and then through adsorber bed 12 to purge the adsorbent bed.

An inlet conduit 52 extending from upper chamber 30 allows high pressure feed gases to enter the adsorber apparatus 10. An outlet conduit 54 extending from lower chamber 32 allows desorbed gases to leave the adsorber apparatus 10. An outlet conduit 56 extending from upper chamber 36 allows for the exit of purified gaseous material from the adsorber 10.

As the adsorber bed 12 rotates, the baffles 28 and 34 ride against the tube sheets 16 and 18, therefore requiring radial face seals 40 and 44. The seals 40 and 44 are retained in brackets 48 and 50, respectively, which are attached to baffles 28 and 34 respectively.

FIG. 2 shows in detail one suitable embodiment of a radial face seal 40. The following description would likewise apply to seal 44. Seal 40 is fastened tightly to baffle 28, for example by a nut-bolt combination 58, or other suitable means and is gasketed to prevent leakage of high pressure gases. The radial face seal 40 can be any suitable device which prevents leakage of high pressure gas between the baffle 28 and the tube sheet 16. The radial face seal 40 can be, for example, an inflatable elastomer tube, pressurized either externally or from the high pressure gases within the adsorber 10. The radial face seal 40 is contained by bracket 48 and the longitudinal baffle 28. When the seal 40 is inflated, it presses tightly against the tube sheet 16 and prevents leakage of gases as the adsorber bed 12 rotates.

A circumferential seal (not shown in FIG. 1) must be provided between the edges of the tube sheets 16 and 18 and the adsorber shell 22 to prevent pressurized gases from bypassing the adsorber bed 12.

Figure 3:
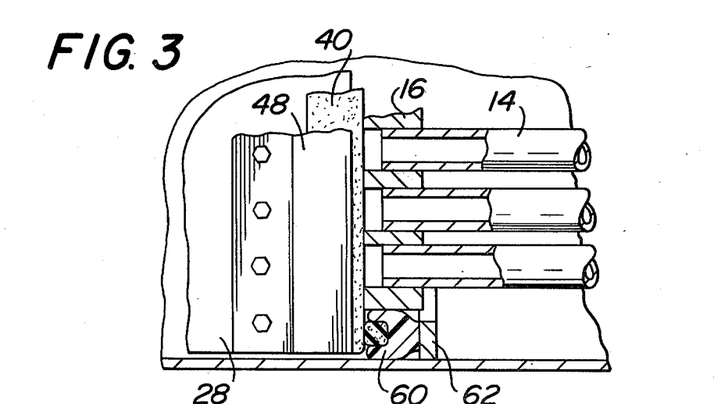
FIG. 3 is a sectional view taken along the line 3—3 of FIG. 2.

FIG. 3 shows the details of one suitable example of a circumferential ring seal 60. Seal 60 can be any suitable sealing device which prevents leakage of high pressure gas between the tube sheet 16 and adsorber shell 22. There is an equivalent ring seal (not shown) associated with tube sheet 18 and adsorber shell 22. Ring seal 60 may be a spring energized elastomer seal of the type manufactured by the Fluorocarbon Company, Mechanical Seal Division. A retainer ring 62 holds the seal 60 in place while the adsorber bed 12 is rotating.

The seal required between the stationary sleeve 40 and the rotating tube sheets 16 and 18 can be a standard packed or mechanical seal commonly used for this type of application.

Figure 4:
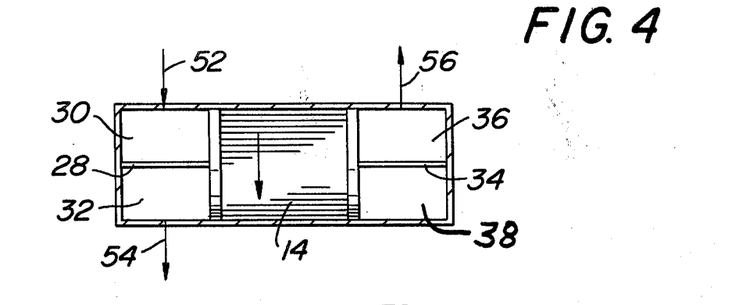
FIG. 4 is a schematic representation of the apparatus shown in FIG. 1.

FIG. 4 is a schematic representation of the adsorber apparatus 10 shown in FIG. 1. High pressure gaseous materials to be separated or purified enter chamber 30 of adsorber 10 through conduit 52. The gaseous material flows through the adsorber tubes 14 where the more readily adsorbable component (usually the impurity) is adsorbed. The purified gaseous material, the least adsorbable component, flows into chamber 36 and leaves the adsorber 10 via conduit 56. As the adsorber bed 12 rotates, tubes 14 loaded with the highly pressurized more readily adsorbable component and any adsorbed portion of the less adsorbable component pass from the high pressure zone including chambers 30 and 36 to the low pressure zone including chamber 32. The highly pressurized adsorbed components are released from the tubes and flow from the tubes into chamber 32. The tubes and adsorbent are depressurized and desorbed of adsorbed gaseous material. The desorbed gaseous material including the more readily adsorbable component and any remaining adsorbed portion of the less readily adsorbable component, leave the adsorber 10 through outlet 54. The adsorbent is thus regenerated so that it is again ready for adsorption when the tube bundle 14 moves past baffles 28 and 34 into the high pressure zone. As adsorber bed 12 rotates past the low pressure zone including chamber 32 into the high pressure zone including chamber 30, the remaining gaseous material in tubes 14 is repressurized and thereby adsorbed by the adsorbent.

The apparatus illustrated in FIGS. 1 and 4 is designed to provide high purity product only for the least adsorbable component of the gaseous material. Thus, although a highly pure least adsorbable component is recoverable through outlet 56 of chamber 36, the more readily adsorable component leaving chamber 32 of adsorber 10 through outlet 54 will contain a significant amount of the least adsorbable component. The recovery efficiency of the least adsorbable component could vary significantly and would depend on the relative adsorbtivity of the components of the gaseous material.

Figure 5:
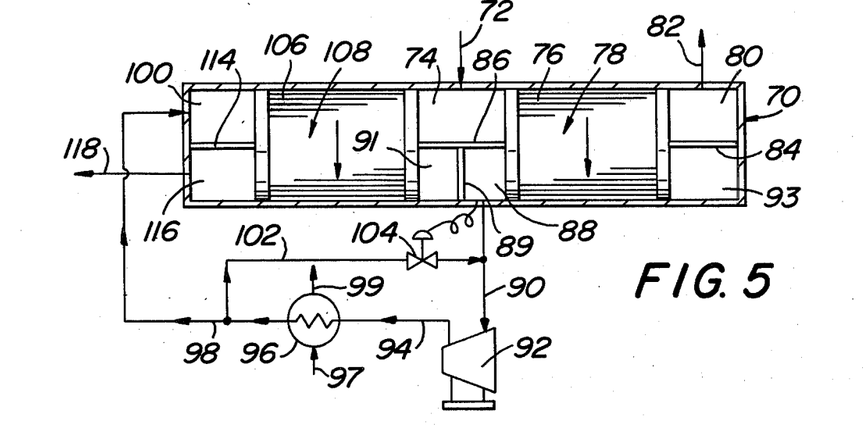
FIG. 5 is a schematic diagram of a two-stage continuous rotary pressure-swing adsorber system.

If a greater recovery efficiency or higher purity products are required, an adsorber apparatus 70 schematically shown in FIG. 5 may be used. Gaseous material, such as a gas mixture containing 25% carbon dioxide and 75% methane at about 200 p.s.i.a., is fed into a high pressure chamber 74 of adsorber 70 as represented by arrow 72. The gas mixture flows through the adsorbent filled tubes 76 of adsorber bed 78 into high pressure outlet chamber 80. As the gas flows through the adsorbent, the more readily adsorbable carbon dioxide as well as a smaller portion of the less readily adsorbable methane is adsorbed. The gas leaving chamber 80 of adsorber 70 as represented by arrow 82 is high purity methane.

As the adsorber bed 78 rotates, the tubes 76 containing adsorbent loaded with carbon dioxide and a small amount of methane move from the high pressure chambers 74 and 80 into the low pressure, regenerating zone. The tubes 76 are depressurized to 20 p.s.i.a., for example, and the carbon dioxide and methane are stripped from the adsorbent and flow through the tubes 76 into a first low pressure chamber 88. This gas mixture flows from chamber 88 through conduit 90 and into compressor 92 where the gas is compressed back up to about 200 p.s.i.a.

The gas mixture leaving chamber 88 could contain, for example, approximately 50% carbon dioxide and 50% methane, depending on the regenerating pressure and the characteristics of the specific adsorbent. As the adsorber bed 78 rotates from the low pressure zone (chamber 88) into the high pressure zone (chambers 74 and 80), the adsorbent continues to be depressurized and regenerated so that it is ready for adsorption again when the tubes 76 move past baffles 84 and 86 into the high pressure, adsorption zone.

A baffle 89 separates chamber 88 from idle chamber 91. Chamber 93 is also an idle chamber. The compressed gas mixture flows through conduit 94 and to an aftercooler 96 where the heat of compression is removed. A cooling fluid, for example water, flows into the aftercooler 96 through conduit 97 and exits the aftercooler 96 through conduit 99. The cooled gas mixture flows through conduit 98 into a second high pressure inlet chamber 100 of adsorber 70. A slip stream flows from conduit 98 through conduit 102 back into conduit 90. A valve 104 automatically controls this flow so as to maintain the regeneration pressure in chamber 88.

The carbon dioxide-methane gas mixture (approximately 50% of each gas) flows from chamber 100 through tubes 106 of a second adsorber bed 108 and into chamber 74 where it combines with the feed gas entering through line 72. As the gas mixture flows through tubes 106, the carbon dioxide is adsorbed preferentially on the adsorbent. Because of the adsorption, the gas composition entering chamber 74 from bed 108 is similar to the feed gas composition entering through line 72. Since the gas mixture flowing through adsorber bed 108 contains a higher concentration of carbon dioxide than the mixture flowing through adsorber bed 78, a correspondingly greater amount of carbon dioxide will be adsorbed in bed 108 than in bed 78. Similarly, a greater amount of pure methane exits the apparatus as represented by arrow 82.

As the adsorber bed 108 rotates, the tubes 106 containing adsorbent loaded with carbon dioxide move from the high pressure side of baffles 86 and 114 (chambers 74 and 100) into the low pressure, regenerating zone (chamber 116). The tubes 106 are depressurized to about 20 p.s.i.a. and the carbon dioxide and a lesser amount of methane are stripped from the adsorbent. The stripped gas flows through the tubes 106 into chamber 116 where it leaves the adsorber through conduit 118. The gas mixture leaving chamber 116 could contain, for example, about 66% carbon dioxide and about 34% methane, depending on the regenerating pressure and the characteristics of the specific adsorbent.

By using a two-bed system in series as depicted in FIG. 5, the methane recovery efficiency could be increased by about 24% and the carbon dioxide product purity could be increased from about 50% to about 66% as compared to the system depicted in FIG. 4. This is summarized in the material balance shown in Table 1.

TABLE 1

| | Material Balance (basis: 100 standing ft$^3$/min) | | |
|---|---|---|---|
| Component | Feed (ft$^3$/min) | CH$_4$ Product (ft$^3$/min) | CO$_2$ Product (ft$^3$/min) |
| | Single-Bed System | | |
| CO$_2$ | 25 | nil | 25 |
| CH$_4$ | 75 | 50 | 25 |
| | 100 | 50 | 50 |
| | Two-Bed System | | |
| CO$_2$ | 25 | nil | 25 |
| CH$_4$ | 75 | 62 | 13 |
| | 100 | 62 | 38 |

The two-bed system would provide a 24% increase in methane recovery and an increase in carbon dioxide from about 50% to about 66% in the desorbed gas mixture.

Figure 6:
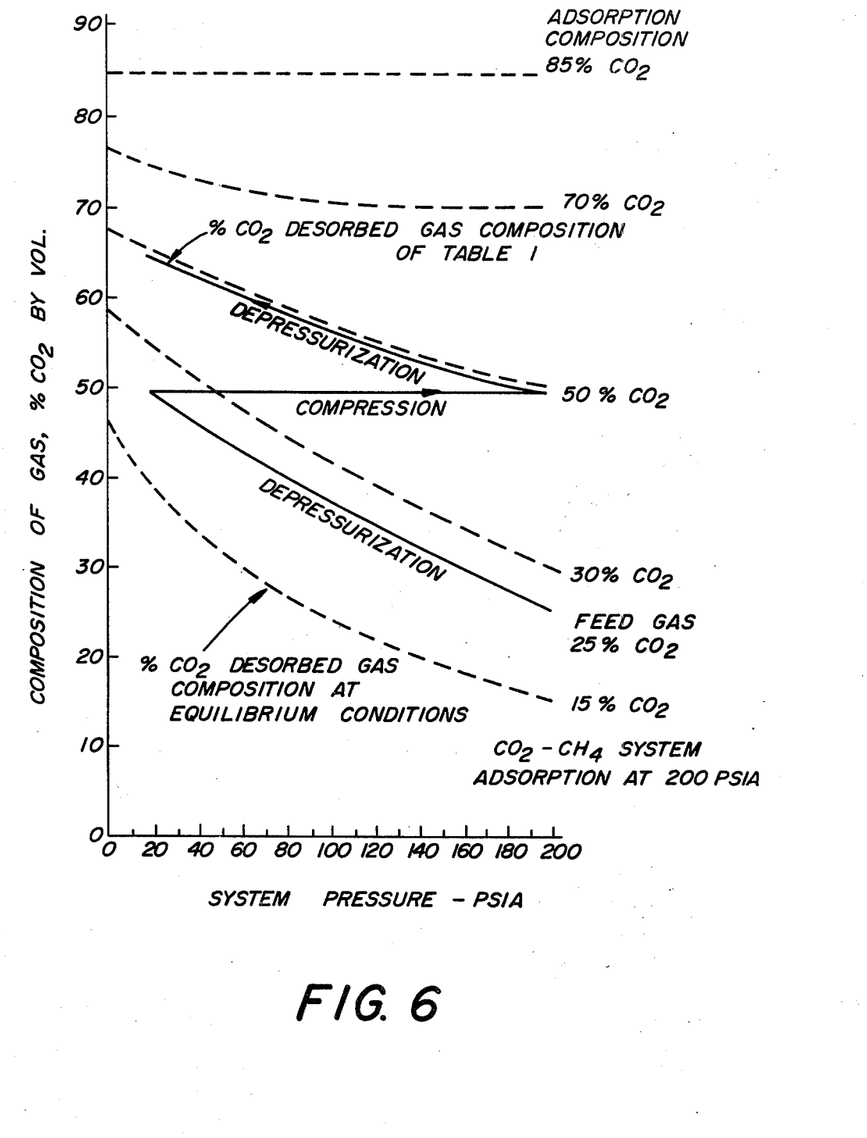
FIG. 6 is a graph which illustrates the performance of the two-stage apparatus shown in FIG. 5 when applied to the separation of carbon dioxide and methane.

FIG. 6 graphically illustrates the performance of the two-bed system as illustrated in FIG. 5 for the aforesaid gas mixture, using a specific activated carbon adsorbent and assuming ideal behavior of the gas mixture.

The dashed lines on the graph in FIG. 6 represent the equilibrium composition of the desorbed gases stripped from an adsorbent which has been loaded at 200 p.s.i.a. with the indicated gas composition. As the desorption pressure is lowered, the carbon dioxide composition in the stripped gas increases. The solid lines on the graph represent the performance of the illustrated example. Feed gas containing 25% carbon dioxide and 75% methane is adsorbed at 200 p.s.i.a. As the adsorbent is depressurized to 20 p.s.i.a. the desorbed, stripped gas composition approaches 50% carbon dioxide. This gas is compressed back to 200 p.s.i.a., readsorbed and then the adsorbent is depressurized again to 20 p.s.i.a. The resulting by-product gas composition is about 66% carbon dioxide.

Figure 7:
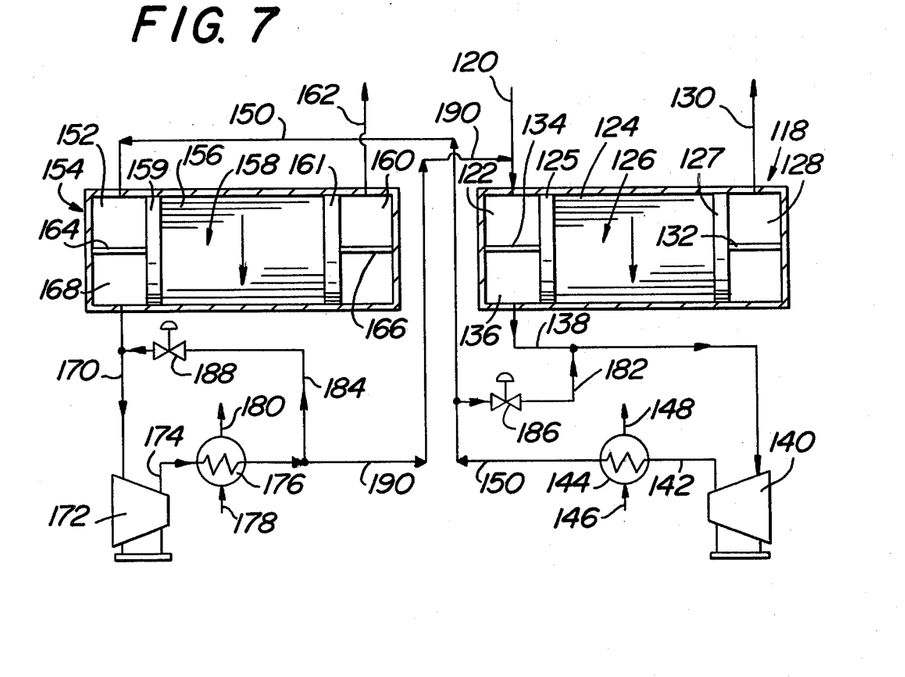
FIG. 7 is a schematic diagram of two separate continuous rotary pressure-swing adsorbers arranged for a sequential separation process according to the present invention.

The two-bed system can be designed in two separate units arranged in series as shown schematically in FIG. 7. This drawing will hereinafter be described in accordance with the separation of air into nitrogen and oxygen.

Compressed air enters the adsorber 118 through conduit 120 and flows into high pressure chamber 122. The air flows through the tubes 124 of adsorber bed 126. Tube sheets 125 and 127 are at opposite ends of adsorber bed 126. The tubes 124 contain an activated carbon adsorbent. As the air passes through the tubes 124, oxygen is preferentially adsorbed (along with some residual nitrogen) so that the gas flowing into high pressure chamber 128 and leaving the adsorber through conduit 130 is a high purity nitrogen product.

When the adsorber bed 126 rotates so the tubes pass baffles 132 and 134 into the depressurizing zone, the adsorbed oxygen is released from the activated carbon. Oxygen and residual nitrogen flow through the tubes 124 into low pressure chamber 136. The oxygen-rich gas leaves the adsorber 118 through conduit 138 and flows to compressor 140 where it is repressurized to equal the pressure of the gas originally introduced into chamber 122.

The compressed gas flows through conduit 142 to the aftercooler 144, where the heat of compression is removed. Cooling water enters the aftercooler 144 via conduit 146 and exits the aftercooler 144 via conduit 148.

The cooled, oxygen-rich gas mixture flows through conduit 150 into high pressure chamber 152 of a second adsorber 154. The oxygen-rich gas mixture flows through the tubes 156 of the adsorber bed 158. Tube sheets 159 and 161 are at opposite ends of the adsorber bed 158. Tubes 156 are packed with a molecular sieve adsorbent which preferentially adsorbs nitrogen (and a portion of oxygen) from the gas mixture. The gas flows from the tubes 152 into high pressure chamber 160 and leaves adsorber 154 through conduit 162 as a high purity oxygen product.

As the adsorber bed 158 rotates, the tubes pass baffles 164 and 166 into the depressurizing zone, and the adsorbed nitrogen and residual oxygen is released from the molecular sieve adsorbent. This desorbed gas stream flows into low pressure chamber 168 and then leaves adsorber 154. The desorbed gas goes through conduit 170 and enters compressor 172 where it is repressurized to equal the pressure of the gas originally introduced into chamber 122. The compressed gas flows through conduit 174 to aftercooler 176, where the heat of compression is removed. Cooling water enters the aftercooler 176 via conduit 178 and exits the cooler 176 via conduit 180. By-pass conduits 182 and 184 and provided around compressors 140 and 172, respectively, to maintain the regenerating low pressure as described hereinabove in regard to FIG. 5. Valve 186 is associated with by-pass conduit 182 and valve 188 is associated with by-pass conduit 184.

The cooled gas from the aftercooler 176 flows through conduit 190 to conduit 120. Here it combines with the air feed stream to adsorber 118.

This process described above with respect to FIG. 7 provides a relatively inexpensive, energy-efficient method for separating air into high purity oxygen and nitrogen products. The adsorption temperatures and pressures can be optimized along with the design parameters of the apparatus to provide the most economical system for the desired product purity.

The disadvantage of the two-bed cyclic pressure-swing adsorption system is that during desorption, high pressure gas is released so that desorption can occur at low pressures. This depressurization represents a loss in product. The short cycles employed can make these losses significant. For this reason four or more beds are employed so that the depressurization of one bed can be used to purge and regenerate, and then repressurize the other beds. The number of beds employed is optimized based on increased capital cost compared with greater product recovery.

Figure 8:
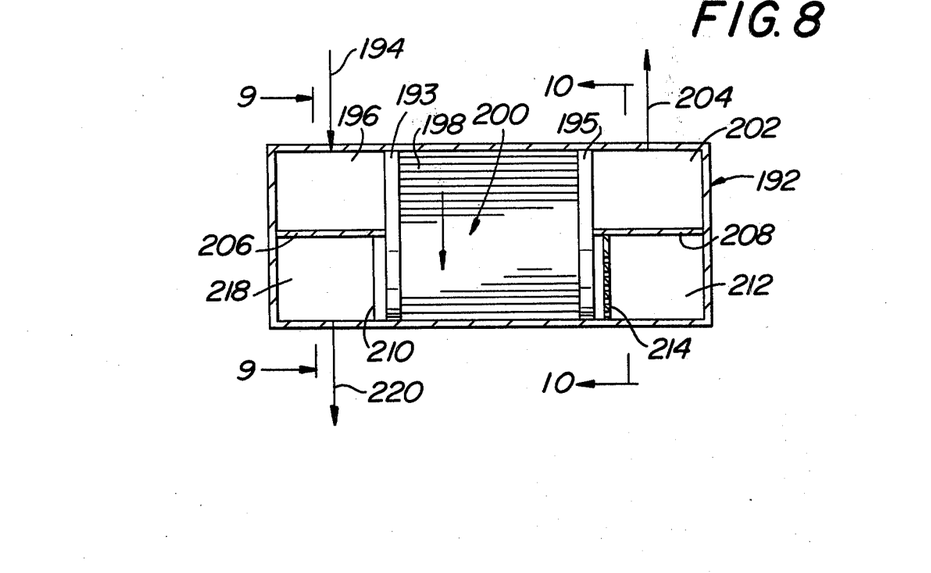
FIG. 8 is a schematic diagram of a continuous rotary pressure-swing adsorber incorporating depressurization, purging and repressurization sections.

FIG. 8 is a schematic diagram which shows how the concept of purge and repressurization can be applied to the continuous, rotary pressure-swing adsorber of the present invention. The sectional views shown in FIGS. 9 and 10 illustrate important features of this concept, although other equivalent means may be used to accomplish the same results.

Adsorber 192 includes an inlet schematically represented by arrow 194 for high pressure gaseous material. The gaseous material enters a high pressure inlet chamber 196. Tubes 198 of the type described above are contained in rotating bed 200. Tube sheets 193 and 195 are dispose at the ends of bed 200. A high pressure outlet chamber 202 leads to an outlet schematically represented by arrow 204.

A baffle 206 forms a barrier between high pressure input chamber 196 and low pressure chamber 218. A baffle 208 separates high pressure outlet chamber 202 from an intermediate pressure chamber 212. Stationary assemblies, which may be in the form of end plates 210 and 214, for example, are disposed at the lower portions of opposite ends of adsorber bed 200. End plates 210 and 214 are associated with and sealed against tube sheets 193 and 195, respectively, for the purposes set forth below. Chamber 212 and end plate 214 are axially aligned with chamber 218 and end plate 210.

Figure 9:
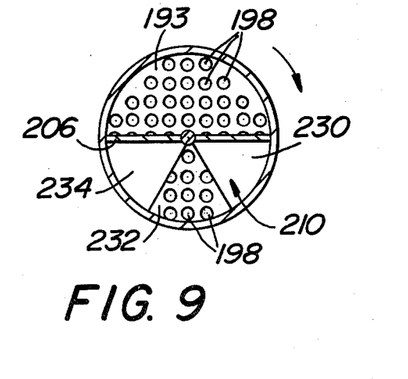
FIG. 9 is a sectional view taken along the line 9—9 of FIG. 8.
Figure 10:
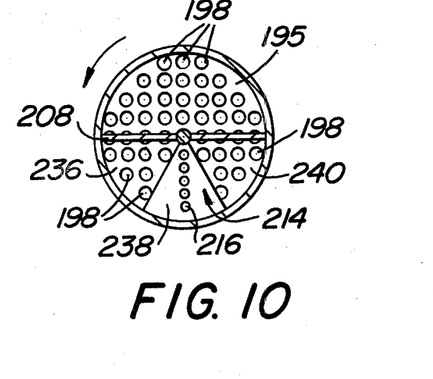
FIG. 10 is a sectional view taken along line 10—10 of FIG. 8.

The end plates are best illustrated in FIGS. 9 and 10. Tube sheet 193 and tubes 198 are illustrated in the upper portion of FIG. 9 as rotating in the direction indicated by the arrow. Tube sheet 195 and tubes 198 are illustrated in the upper portion of FIG. 10, with the arrow indicating the direction of rotation. The portions of FIGS. 9 and 10 below baffles 206 and 208, respectively, include end plates 210 and 214, respectively, which are stationary and do not rotate.

End plates 210 and 214 are divided into a number of portions or segments. The segments of end plate 210 are axially aligned with the segments of end plate 214. In the embodiment illustrated in FIGS. 9 and 10, the end plates are divided into three segments. Three segments for each end plate are preferred to correspond to a three stage regenerating zone where depressurization, purge and regeneration, and repressurization occur simultaneously with respect to different tubes 198 in adsorbent bed 200. The simultaneous operation provides for the continuous separation or purification of the gaseous material.

End plate 210 comprises segments 230, 232 and 234. The edges of segments 230 and 234 are sealed against tube sheet 193 to prevent leakage around the segments. Segments 230 and 234 are impervious to the gaseous material. Segment 232 may be an opening in the end plate or may comprise an apertured portion including apertures which may be of the same size and arrangement as the apertures in tube sheet 193. Such apertures may be of a larger size or have a different arrangement, if desired. As illustrated in FIG. 9, segment 232 is an open area through which tubes 198 are visible. End plate 214 includes segments 236, 238 and 240. Segments 236 and 240 are open areas through which tubes 198 are visible on either side of segment 238. The edges of segment 238 are sealed against tube sheet 195 to prevent leakage around the segment. Segments 236 and 240 alternately may include a plurality of apertures of the same size and arrangement as the apertures in tube sheet 195 for tubes 198. Alternately, such apertures may be of a larger size or different arrangement as the apertures in tube sheet 195.

Segment 238 contains a number of small apertures 216. Apertures 216 are present in a number, a size and an arrangement so that any flow of gaseous material through segment 238 is restricted.

The relative size of the various segments will depend upon the design parameters of the system, the gaseous material involved, etc.

The operation of the apparatus illustrated in FIGS. 8, 9 and 10 will now be described.

Pressurized gaseous material enters adsorber 192 through inlet 194 into high pressure inlet chamber 196. From there, the pressurized gaseous material flows through the tubes of rotating bed 200, where the more adsorbable component of the gaseous material is adsorbed, together with a small portion of the less adsorbable component. The pure less adsorbable component enters high pressure outlet chamber 202 and is recovered through outlet 204.

As adsorbent bed 200 continues to rotate, some tubes will become aligned with segment 230 of end plate 210 and segment 236 of end plate 214. When tubes 198 are aligned with open segment 236, a depressurization of adsorbent tubes 198 occurs, because the pressure in chamber 212 is maintained at a level intermediate between the pressure in high pressure inlet chamber 196 and high pressure outlet chamber 202 on the one hand, and the pressure of low pressure chamber 218, on the other hand. The previously adsorbed more adsorbable component and any portion of the previously adsorbed less adsorbable component begin to desorb when tubes 198 are aligned with segment 236. Because segment 230 of end plate 210 is blocked, the flow path extends from bed 200 into chamber 212.

As the bed continues to rotate, the tubes enter the area defined by aligned segments 232 and 238, so that a flow path exists from intermediate pressure chamber 212 through adsorbent bed 200 to low pressure chamber 218. Because of the size, number and/or arrangement of apertures 216 in segment 238, the flow of gaseous material is restricted from intermediate pressure chamber 212 back into adsorbent bed 200 and out of chamber 218 through outlet 220. The restricted flow through apertures 216 is also responsible for maintaining the intermediate pressure in chamber 212. Suitable intermediate pressures will be subject to the design parameters of the system and gaseous materials being purified. However, generally, for example, where a high purity product is sought, the intermediate pressure should be maintained closer to the high pressure than to the low pressure. When tubes 198 are aligned with apertured segment 238 and open segment 232, the desorbed components of the gaseous material flow through bed 200 to at least partially purge and regenerate the adsorbent material. Purging and regeneration are enhanced by the communication between absorbent tubes 198 and low pressure chamber 218 through segment 232.

As the bed continues to rotate, the tubes enter an area defined by aligned segments 234 and 240. This is the repressurization zone. The gaseous components present in intermediate pressure chamber 212 flow through open segment 240 into tubes 198 of bed 200. Because plate 234 is impervious to the gaseous material, pressure is built up to the intermediate pressure within the aligned adsorbent tubes 198 so that any of the more adsorbable component present in the tubes is adsorbed preferentially again.

As the bed continues to rotate, the tubes reach a level above baffle 206 so that they are in the high pressure zone aligned with high pressure inlet chamber 196 and high pressure outlet chamber 202. The apparatus and process illustrated in FIGS. 8, 9 and 10 considerably reduce the loss of product during depressurization. The faster adsorbent bed 200 rotates, the more product can be produced, bearing in mind the design parameters necessary for the particular gaseous material and adsorbent required therefore. The apparatus and process illustrated in FIGS. 8, 9 and 10 is a true continuous process for separating or purifying gaseous material.

Although stationary assemblies in the form of endplates 210 and 214 are illustrated in FIGS. 9 and 10 as having three segments, any other form of stationary assemblies associated with the tube sheets could be used with more than three segments for an increased number of depressurization and repressurization zones. For example, segments 236 and 240 could be sub-divided into a number of subsections. The subsections of segment 236 could be in communication with corresponding subsections of segment 240, so that the highly pressurized gaseous material within the tubes aligned with a particular subsection of segment 236 would flow into the tubes aligned with a corresponding particular subsection of segment 240. In this way, the subsections of segment 240 would be at least partially repressurized at a series of intermediate pressures, as the tubes aligned with the subsections of segment 236 are partially depressurized. In general, the larger the number of segments or subsections providing for depressurization and repressurization, the less the loss of pure product and the greater the recovery of pure product is possible.

Regeneration of the adsorbent used in the apparatus and process of the present invention can be enhanced by providing a hot gas purge for the systems. For example, in the system shown in FIG. 8. This could be accomplished by removing gas from chamber 212 to an external heater. The heated gases then would flow back through the orifices 216 in segment 238.

As illustrated in the examples described herein, the applications of this apparatus and process are broad and flexible. They can be easily adapted to the wide range of processes employed in the gas process industry.

The present invention may be embodied in other specific forms without departing from the spirit or essential attributes thereof and, accordingly, reference should be made to the appended claims, rather than to the foregoing specification, as indicating the scope of the invention.

I claim:

1. A pressure swing adsorption process for separating or purifying a gas mixture having more and less adsorbable components selectively adsorbable at predetermined pressure levels comprising continuously and simultaneously subjecting a rotating bed of adsorbent material to the following steps by rotating the bed to sequentially align discrete adjacent sections of the bed with a plurality of sectors within a single vessel:
 (a) sequentially aligning each section of the bed with a first sector of the vessel in which pressurized gas mixture flows through the section of the bed aligned with the first sector and contacts the adsorbent to adsorb the more adsorbable component, thereby separating the more adsorbable component from the less adsorbable component;
 (b) recovering the unadsorbed less adsorbable component as a primary product;
 (c) subsequently sequentially aligning each section with a second sector of the vessel in which the pressure is lowered to desorb from the section of the bed aligned with the second sector the adsorbed more adsorbable component and any adsorbed portion of the less adsorbable component; and (d) recovering the desorbed components as a secondary product.

2. A process according to claim 1 further comprising repressurizing the desorbed components and recycling a portion of the desorbed components through the process beginning at step (a).

3. A process according to claim 1 or 2 further comprising maintaining a constant low pressure in the section of the bed aligned with the second sector during step (c).

4. A process according to claim 1 further comprising a step between steps (b) and (c) of subsequently sequentially aligning each section with a third sector of the vessel in which the pressure is lowered in the section of the bed aligned with the third sector to an intermediate pressure between the pressures of steps (a) and (c).

5. A process according to claim 1 further comprising the use of two rotating beds, each in separate vessels operating in a series manner and containing different adsorbent materials each capable of preferentially adsorbing different components of the gas mixture and further comprising the steps of:

(e) pressurizing the desorbed components from step (d);

(f) causing the pressurized desorbed components to contact and flow through a first section of the second rotating bed containing a different adsorbent capable of selectively adsorbing the previously less adsorbable component of the first rotating bed to adsorb the previously less adsorbable component of the first rotating bed, the first section of the second bed being aligned with a first sector of the second vessel;

(g) recovering from the second bed the unadsorbed previously more adsorbable component of the first bed;

(h) subsequently sequentially aligning each section of the second bed with a second sector of the second vessel in which the pressure is lowered to desorb from the aligned section of the second bed aligned with the second sector of the second vessel the adsorbed previously less adsorbable component of the first bed and any adsorbed portion of the previously more adsorbable component of the first bed;

(i) recovering the desorbed components from the second bed; and (j) pressurizing at least a portion of the desorbed components and recycling them to the first vessel to join with the process stream in step (a).

6. A pressure swing adsorption process for separating or purifying a gas mixture having more and less adsorbable components selectively adsorbable at predetermined pressure levels comprising continuously and simultaneously subjecting a rotating bed of adsorbent material to the following steps by rotating the bed to sequentially align discrete adjacent sections of the bed with a plurality of sectors within a single vessel:

(a) sequentially aligning each section of the bed with a first sector of the vessel in which the pressurized gas mixture flows through the section of the bed aligned with the first sector and contacts the adsorbent to adsorb the more adsorbable component, thereby separating the more adsorbable component from the less adsorbable component;

(b) recovering the unadsorbed less adsorbable component as a primary product;

(c) subsequently sequentially aligning each section of the bed with a second sector of the vessel in which the pressure is lowered in the section of the bed aligned with the second sector to an intermediate pressure between the pressures of steps (a) and (d), whereby some of the adsorbed more adsorbable component and some of the unrecovered adsorbed portion of the less adsorbable component are partially desorbed;

(d) subsequently sequentially aligning each section of the bed with a third sector of the vessel in which the pressure is lowered in the section of the bed aligned with the third sector to desorb the adsorbed more adsorbable component, and to purge and regenerate the adsorbent with a first portion of the partially desorbed components of step (c);

(e) recovering the desorbed components as a secondary product;

(f) subsequently sequentially aligning each section of the bed with a fourth sector of the vessel and increasing the pressure within the section of the bed aligned with the fourth sector to the intermediate pressure of step (c); and (g) subsequently sequentially aligning each section of the bed with the first segment of the vessel and repeating the process.

7. A process according to claim 6 further comprising at least one step between steps (c) and (d) wherein each section of the bed is aligned with another sector of the vessel in which the pressure is lowered in the section aligned with the other sector to a different intermediate pressure between the pressures of steps (c) and (d), and at least one step between steps (e) and (f) wherein each section of the bed is aligned with an additional sector of the vessel in which the pressure is raised in the section aligned with the additional sector to the level of pressure of the corresponding step between steps (c) and (d).

8. A process according to claim 1 or 6 further comprising purging and regenerating the adsorbent with a hot gas.

9. A process according to claim 1 or 6 further comprising the steps of heating at least a portion of the adsorbed and desorbed more adsorbable component and at least a portion of any adsorbed and desorbed portion of the less adsorbable component, and purging and regenerating the adsorbent with the heated components.

10. Pressure swing adsorption apparatus for separating or purifying a gas mixture having more and less adsorbable components comprising within a common housing a high pressure inlet chamber, a high pressure outlet chamber, and a low pressure chamber, a rotating bed of adsorbent capable of selectively adsorbing the more adsorbable component at a predetermined pressure level, means for establishing a high pressure flow path for the gas mixture from the high pressure inlet chamber through the adsorbent means to the high pressure outlet chamber, the more adsorbable component being adsorbable by the adsorbent in the high pressure flow path, means for establishing a low pressure desorption flow path from the adsorbent means to the low pressure chamber, the means for establishing the flow paths being operable simultaneously to continuously separate or purify the gas mixture.

11. Apparatus according to claim 10 wherein the rotating bed comprises a bundle of tubes generally parallel to the longitudinal axis, the tubes containing the adsorbent material, the rotating bed and the housing having a common longitudinal axis about which the rotating bed rotates, the rotating bed including apertured plates having a plurality of apertures formed therein, and being attached to opposite ends thereof perpendicular to the longitudinal axis through which the gas mixture flows, the edges of the plates being sealed against the housing with circumferential seals, and wherein the high pressure inlet chamber and the low pressure chamber are located between one end of the housing and one apertured plate at one end of the rotating bed, the apparatus further comprising first baffle means to separate the high pressure inlet chamber from the low pressure chamber to prevent direct flow of the gas mixture therebetween, first sealing means extending between the baffle means and the one apertured plate to seal the interface of the baffle means and the one apertured plate, the high pressure outlet chamber being located between the other end of the housing and the other apertured plate at the other end of the rotating bed, the high pressure outlet chamber being at least partially axially aligned with the high pressure inlet chamber without being aligned with the low pressure chamber, an additional chamber within the housing located adjacent to and separated from the high pressure outlet chamber by second baffle means to prevent flow of the gas mixture therebetween, and second sealing means extending between the second baffle means and the other apertured plate to seal the interface of the second baffle means and the other apertured plate.

12. Apparatus according to claim 11 further comprising means within the housing for establishing a flow path first from the rotating bed to the additional chamber which then becomes an intermediate pressure chamber and then from the intermediate pressure chamber through the rotating bed to the low pressure chamber, wherein the means for establishing the flow path to and from the intermediate pressure chamber comprises a first apertured stationary assembly within the intermediate pressure chamber adjacent to the other apertured plate, the first apertured stationary assembly including means for restricting the flow of the gas mixture therethrough, and a second stationary assembly within the low pressure chamber adjacent to the one apertured plate, the second stationary assembly having a substantially unrestricted flow path between impermeable portions of the second stationary assembly, the first and second stationary assemblies being so aligned as to create a restricted flow path from the intermediate pressure chamber, through the first apertured stationary assembly, through the rotating bed, through the unrestricted flow path between the impermeable portions of the second stationary assembly and into the low pressure chamber.

13. Apparatus according to claim 12 wherein the first stationary apertured assembly is axially aligned with the unrestricted flow path between two impermeable portions of the second stationary assembly.

14. Apparatus according to claim 12 further comprising means for at least partially repressurizing the gas mixture remaining in the rotating bed after the desorbed more adsorbable component flows into the low pressure chamber.

15. Apparatus according to claim 14 further comprising means for repressurizing and recycling from the low pressure chamber to the high pressure inlet chamber a portion of the more adsorbable component and any adsorbed and desorbed portion of the less adsorbable component.

16. Pressure swing adsorption apparatus for separating and purifying a gas mixture having more and less adsorbable components comprising a first apparatus according to claim 10, means for pressurizing the desorbed more adsorbable component and any desorbed portion of the less adsorbable component exiting from the low pressure chamber of the first apparatus, means for conveying at least a portion of the pressurized desorbed more adsorbable component and the pressurized desorbed portion of the less adsorbable component to the high pressure inlet chamber of a second apparatus according to claim 10.

17. Apparatus according to claim 16 wherein both apparatus are housed within the same common housing, and further comprising means for establishing a flow path from the high pressure inlet chamber of the second apparatus through the rotating bed of the second apparatus and directly into the high pressure inlet chamber of the first apparatus.

18. Pressure swing adsorption apparatus for separating and purifying a gas mixture having more and less adsorbable components comprising a first apparatus according to claim 10, means for pressurizing the desorbed more adsorbable component and any desorbed portion of the less adsorbable component exiting from the low pressure chamber of the first apparatus, means for conveying the pressurized desorbed more adsorbable component and the pressurized desorbed portion of the less adsorbable component to the high pressure inlet chamber of a second apparatus according to claim 10, the rotating bed of the second apparatus containing adsorbent capable of selectively adsorbing the component which was the less adsorbable component in the first apparatus, and means for establishing a flow path from the low pressure chamber of the second apparatus to the high pressure inlet chamber of the first apparatus.

* * * * *